United States Patent [19]

Herr et al.

[11] 3,717,677

[45] Feb. 20, 1973

[54] OXYGENATED 1-AMIDOADAMANTANES

[75] Inventors: Milton E. Herr, Kalamazoo; Herbert C. Murray, Hickory Corners; Gunther S. Fonken, Galesburg, all of Mich.

[73] Assignee: The Upjohn Company, Kalamazoo, Mich.

[22] Filed: Feb. 18, 1971

[21] Appl. No.: 116,645

Related U.S. Application Data

[63] Continuation-in-part of Ser. No. 4,774, Jan. 21, 1970, which is a continuation-in-part of Ser. No. 666,990, Sept. 11, 1967, abandoned, which is a continuation-in-part of Ser. No. 528,346, Feb. 18, 1966, abandoned.

[52] U.S. Cl......260/557 R, 260/295.5 S, 260/326 D, 260/345.9, 260/456 A, 260/469, 260/476 C, 260/478, 260/485 R, 260/486 R, 260/501.17, 260/501.18, 260/558 R, 260/561 R, 260/563 P, 260/570.8 TC, 260/570.9, 260/584 R, 260/584 A, 424/299, 424/305, 424/308, 424/320, 424/324, 424/325, 424/330, 195/51 R

[51] Int. Cl.............................................C07c 103/30
[58] Field of Search......................260/558, 561, 557

[56] References Cited

OTHER PUBLICATIONS

Stetter et al., Angew Chem., Internat'l. Ed., Vol. 4, (Feb. 1965), p. 153–54 QD1Z51.

*Primary Examiner*—Harry I. Moatz
*Attorney*—John Dekich and Ward F. Nixon

[57] ABSTRACT

A novel method for the introduction of oxygen into 1-aminoadamantanes by bioconversion to obtain the corresponding oxygenated 1-amidoadamantanes which can be chemically converted to novel derivatives thereof. These novel bioconversion products and their derivatives are of particular value as central nervous system stimulants.

15 Claims, No Drawings

OXYGENATED 1-AMIDOADAMANTANES

CROSS REFERENCE TO RELATED APPLICATIONS

This application is a continuation-in-part of application Ser. No. 4,774, filed Jan. 21, 1970, which in turn is a continuation-in-part of abandoned application Ser. No. 666,990, filed Sept. 11, 1967, which in turn is a continuation-in-part of abandoned application Ser. No. 528,346, filed Feb. 18, 1966.

SUMMARY OF THE INVENTION

The products of this invention are represented by the following structural formulas:

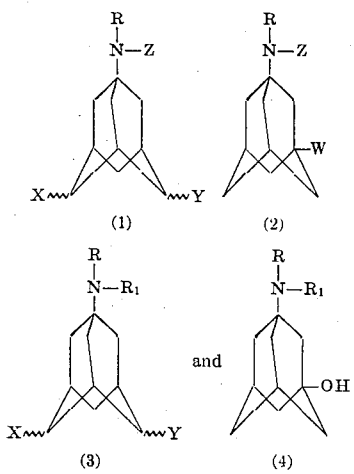

wherein Z is an acyl radical of a monobasic hydrocarbon carboxylic acid of from one to 18 carbon atoms, inclusive, selected from the group consisting of alkanoyl, alkenoyl, alkynoyl, cycloalkanoyl, cycloalkenoyl, aroyl, aralkanoyl, aralkenoyl and aralkynoyl. For example, monobasic saturated and unsaturated aliphatic acids and aromatic acids such as formic, acetic, propionic, butyric, isobutyric, tert.-butylacetic, valeric, isovaleric, caproic capyrlic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, cyclopentylpropionic, myristic, palmitic and stearic acids; R is hydrogen, alkyl, cycloalkyl, aryl or aralkyl; $R_1$ is hydrogen, alkyl, aralkyl, or cycloalkylmethyl; X is hydrogen, hydroxy, keto or acyloxy; Y is hydroxy, keto or acyloxy; W is hydroxy or acyloxy; and the wavy lines ( ) appearing at the 4- and 6- positions indicate the $\alpha$ (alpha) configuration, the $\beta$ (beta) configuration and mixtures thereof, when the attached substituent is hydroxy or a derivative thereof.

In this application the substituents at the 4- and 6- positions of the adamantane ring will be referred to as $\alpha$ when trans to the $C_1$ nitrogen bond and $\beta$ when cis to the $C_1$ nitrogen bond.

The term "alkyl" means an alkyl group of from one to 18 carbon atoms, inclusive such as methyl, ethyl, propyl, butyl, amyl, hexyl, heptyl, octyl, decyl, dodecyl, octadecyl and isomeric forms thereof. The term "cycloalkylmethyl" means the radical, $-CH_2-R_3$ wherein $R_3$ is a cycloalkyl radical of three to six carbon atoms, inclusive, such as cyclopropyl, cyclobutyl, cyclopentyl, and cyclohexyl. The term "cycloalkyl" means the residue of a cycloalkane containing from five to 15 carbon atoms, inclusive, such as cyclopentyl, cylooctyl, cyclododecyl and cyclotetradecyl. The term "aryl" means an aryl radical containing from six to 12 carbon atoms, inclusive, such as phenyl, tolyl, xylyl, naphthyl and biphenyl. The term "aralkyl" means an aralkyl radical of from seven to 13 carbon atoms, inclusive, such as benzyl, phenethyl, phenylpropyl, benzhydryl, naphthylmethyl and O-carboxylbenzyl. The term "acyloxy" means a substituent in which the acyl radical is that of an organic carboxylic acid, preferably a hydrocarbon carboxylic acid of from one to 18 carbon atoms, inclusive. Examples of acids from which such acyl groups are derived are: saturated and unsaturated aliphatic acids and aromatic acids such as acetic, propionic, butyric, isobutyric, tert.-butylacetic, valeric, isovaleric, caproic, caprylic, decanoic, dodecanoic, acrylic, crotonic, hexynoic, heptynoic, octynoic, cyclobutanecarboxylic, cyclopentanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic, myristic, palmitic and stearic acids.

The term "novel compounds of this invention" as used throughout the specification embraces compounds represented by Formulas (1), (2), (3) and (4) above, including the pharmacologically acceptable acid addition salts of the basic compounds of Formulas (3) and (4), such as, sulfuric, hydrochloric, nitric, phosphoric, lactic, benzoic, methanesulfonic, p-toluenesulfonic, salicylic, acetic, propionic, maleic, malic, tartaric, citric, cyclohexanesulfamic, succinic, nicotinic and ascorbic acids.

The novel compounds of this invention are central nervous system stimulants. They are mood elevators and psychic energizers and are useful in the treatment of mental health conditions.

The novel compounds of this invention are useful in the treatment of animals and birds, and are particularly useful in the treatment of humans and valuable domestic animals. They can be administered as active ingredients in conventional pharmaceutical forms such as tablets, capsules, elixirs, injectable solutions and suspensions.

Additionally, the free bases of Formulas (3) and (4) form salts with fluosilicic acid which are useful as mothproofing agents in accord with U. S. Pat. Nos. 1,915,334 and 2,075,359. The free bases of Formulas (3) and (4) also form salts with thiocyanic acid which condense with formaldehyde to form resinous materials useful as pickling inhibitors according to U. S. Pat. Nos. 2,425,320 and 2,606,155.

The microbiological process of this invention is represented by the following reaction scheme:

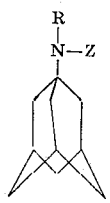

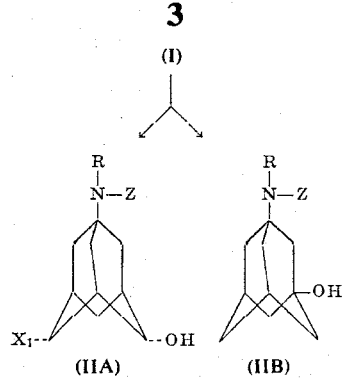

wherein R and Z have the meanings hereinbefore given and $X_1$ is hydrogen or hydroxy.

The microbiological process of this invention comprises subjecting a 1-amidoadamatane (I) to the oxygenating activity of a microorganism of the species, Sprootrichum sulfurescens, Curvularia lunata or Rhizopus arrhizus to obtain the corresponding 1-amidoadamantan-4-ols and 1-amidoadamantan-3-ols of Formulas (IIA; and IIB). The genera Sporotrichum and Curvularia belong to the family Moniliaceae of the order Moniliales of the class Deuteromycetes. The genus Rhizopus belongs to the family Mucoraceae of the order Mucorales of the class Phycomycetes.

The typical strains preferred for the practice of this invention are Sporotrichum sulfurescens, Collection No. ATCC 7159; Curvularia lunata, Collection No. ATCC12017; and Rhizopus arrhizus, Collection No. ATCC 11145, available from the American Type Culture Collection (ATCC), Washington, D. C. It is to be understood that other strains of these microorganisms are suitable for the practice of this invention.

The starting materials (I) for the microbiological process of this invention are either known in the art, see British Pat. No. 1,006,885, or can be prepared in accordance with known methods.

The starting materials of Formula (I) wherein R is hydrogen and Z has the meaning hereinbefore given are prepared from 1-aminoadamantane hydrochloride as disclosed in Preparation 1, 2 and 3 herein. For example, 1-aminoadamantane hydrochloride is treated with a base, such as sodium hydroxide to release the free amine. followed by treatment with the anhydride or acid halide of a monobasic hydrocarbon carboxylic acid, for example, a monobasic hydrocarbon carboxylic acids hereinbefore listed under the definition of Z, above, to obtain the corresponding 1-acylamidoadamantanes.

The starting materials of Formula (I) wherein R is alkyl, cycloalkyl, aryl or aralkyl and Z has the meaning hereinbefore given, are prepared by reacting 1-aminoadamantane with the appropriate alkyl, cycloalkyl, aryl or aralkyl halide, in accordance with the procedure disclosed in British Pat. No. 1,006,885 (Examples 2–17), for example the halides of the alkyl, cycloalkyl aryl and aralkyl radicals hereinbefore listed, such as methyl iodide, ethyl bromide, pentyl bromide, decyl bromide, dodecyl bromide, octadecyl bromide, cyclopentyl bromide, cyclooctyl bromide, cylododecyl iodide, cyclopentadecyl bromide, phenyl bromide, 1- or 2- naphthyl bromide, xylyl bromide, 4-biphenyl bromide, phenylethyl chloride, benzyl bromide etc., to obtain the corresponding 1-substituted alkyl, cycloalkyl, aryl or aralkyl aminoadamantane followed by acylation using the well known Schothen-Baumann reaction, for example, using an acid halide of a monobasic hydrocarbon carboxylic acid, for example one of the acids hereinbefore listed under the definition of Z, above, in the presence of an aqueous base, such as sodium hydroxide to obtain the desired starting materials of Formula (I), wherein R is alkyl, cycloalkyl, aryl or aralkyl as hereinbefore defined and Z has the meanings hereinbefore given.

Alternatively the starting materials of Formula (I) wherein R is an alkyl radical of 2 to 18 carbon atoms, or aralkyl as hereinbefore defined and Z has the meanings hereinbefore given are prepared from the 1-acylamidoadamantanes of Formula (I), wherein R is hydrogen and Z has the meaning hereinbefore given by reducing the acyl radical with a metal hydride, such as lithium aluminum hydride, to obtain the corresponding alkyl and aralkyl substituted 1-aminoadamantanes, followed by acylation with the desired monbasic hydrocarbon carboxylic acid halide using the Schothen-Baumann procedure hereinbefore described.

The operational conditions and reaction procedures for bioconversion process of this invention are advantageously those known in the art of bioconversion as illustrated in Murray et al., U. S. Pat. Nos. 2,602,769 and 2,735,800, utilizing the oxygenating activity of the microorganism Sporotrichum sulfurescens, Curvularia lunata or Rhizopus arrhizus.

In the practice of this invention, the bioconversion can be effected by a growing or resting culture of the microorganism or by spores, washed cells or enzymes of the microorganism.

Culture of the microorganism for the purpose and practice of this invention is in or on a medium favorable to its development. Sources of nitrogen and carbon should be present in the culture medium and an adequate sterile air supply should be maintained during the conversion, for example, by the conventional techniques of exposing a large surface of the medium or by passing air through a submerged culture.

Nitrogen in assimilable form can be provided by sources normally employed in such processes, such as corn steep liquor, soybean meal, yeast extracts, peptone, soluble or insoluble vegetable or animal protein, lactalbumin, casein, whey, distillers solubles, amino acids, nitrates and ammonium compounds, such as ammonium tartrate, nitrate, sulfate and the like.

Available caabon can also be provided by sources normally used in bioconversions such as carbohydrates, e.g., glucose, fructose, sucrose, lactose, maltose, dextrines, starches; meat extracts, peptones, amino acids, proteins, fatty acids, glycerol, whey and the like. These materials may be used either in a purified state or as concentrates such as whey concentrate, corn steep liquor, grain mashes, and the like, or as mixtures of the above. Many of the above sources of carbon can also serve as a source of nitrogen.

The medium can desirably have a pH before inoculation of between about 4 to about 7 though a higher or lower pH can be used. A temperature between about 25° to 32°C. is preferred for growth of the microorganism but higher or lower temperatures within a relatively wide range are suitable.

The substrate (I) can be added to the culture during the growth period of the microorganism as a single feed or by gradual addition during the conversion period, or it can be added to the medium before or after sterilization or inoculation making appropriate adjustments for effects of pH and/or temperature upon the stability of the substrate used. The preferred, but not limiting, range of concentration of the substrate in the culture medium is about 0.1 to 10 grams per liter. The substrate is added to the medium in any suitable manner, especially one which promotes a large surface contact of the substrate to the oxidizing activity of the microorganism for example by dissolving the substrate in an organic solvent and mixing the solution thoroughly with the medium or by adding to the medium finely comminuted particles of the substrate, e.g., micronized particles, preferably 90 percent by weight smaller than 20 microns, either as a dry powder or, preferably for mechanical reasons, as an aqueous suspension. In preparing the aqueous suspension, the use of dispersing or suspending agents is advantageous. Dispersing agents can also be added to the medium.

The temperature during the fermentation can be the same as that found suitable for growth of the microorganism. It need be maintained only within such range as supports life, active growth or the enzyme activity of the microorganism, the range of 20° to 35° C. is preferred. A pH of about 4 to 8 is generally preferred for growth of the microorganism during the bioconversion but for acid-sensitive substrates, the pH should be above 7 during the fermentation. Aeration can be effected by surface culture or preferably under submerged fermentation conditions, in accordance with methods well known in the art. The time required for oxygenation by the enzymatic system of the microorganism employed can vary considerably. The range of about 2 to 120 hours is practical but not limiting; 72 hours is generally satisfactory. The progress of the bioconversion and its completion are conveniently determined by paper-strip chromatography, vapor-phase chromatography of thin-film chromatography [Haftman, Chromatography (1961) Reinhold Publishing Co., New York, New York].

Alternatively, the oxygenation of the selected substrate can be effected under aerobic conditions by subjecting it to the oxygenating action of oxygenating enzymes isolated from the microorganism, to the action of spores of the microorganism, and to the action of isolated cells of the microorganism. Isolated enzyme preparations can be prepared in accordance with the general procedure disclosed by Zuidweg et al., Biochim. Biophy. Acts, 58, 131-133 (1962). Oxygenation can be effected with spores in accordance with the general process disclosed in U. S. Pat. Nos. 3,031,379 and 3,031,382. The separation of washed cells from the fermentation medium is well known in the art, see for example, U. S. Pat. No. 2,831,789.

The term "oxygenating activity" as used throughout this specification means the enzymatic action of a growing or resting culture of the microorganism or of spores, washed cells or isolated enzymes of the microorganism, which effects introduction of oxygen in the molecule of the substrate under aerobic fermentation conditions.

After completion of the fermentation, the resulting oxygenated products (IIA) and (IIB) are recovered from the fermentation beer by conventional methods. For example, the whole beer can be extracted with a water-immiscible organic solvent such as methylene chloride, chloroform, carbon tetrachloride, ethylene chloride, trichloroethylene, ether, amyl acetate, benzene, and the like or the beer and mycelia can be separated by conventional methods such as centrifugation or filtration, and then separately extracted with suitable solvents. The mycelia can be extracted with either water-miscible or water-immiscible solvents or in cases where little or no product is contained in the mycelium, it can be merely washed with water and the wash water added to the beer filtrate. The beer, free of mycelia, can then be extracted with water-immiscible solvents such as those listed above. The extracts are combined, dried over a drying agent such as anhydrous sodium sulfate, and the solvent removed by conventional methods such as evaporation or distillation at at atmospheric or reduced pressure.

Alternatively, the products can be adsorbed from the beer on granular charcoal and the products eluted with a polar organic solvent such as methanol, ethanol, acetone, ethyl acetate, and the like.

The oxygenated products (IIA) and (IIB) obtained by either the extraction or elution procedures can be isolated and further purified by conventional methods, e.g., chromatography and/or crystallization, and the like.

The 1-amidoadamantan-4α-ols, 1-amidoadamantane-4α,6α-diols and 1-amidoadamantan-3-ols of Formulas (IIA) and (IIB), respectively, can be converted to the other compounds of this invention in accordance with the following reaction schemes:

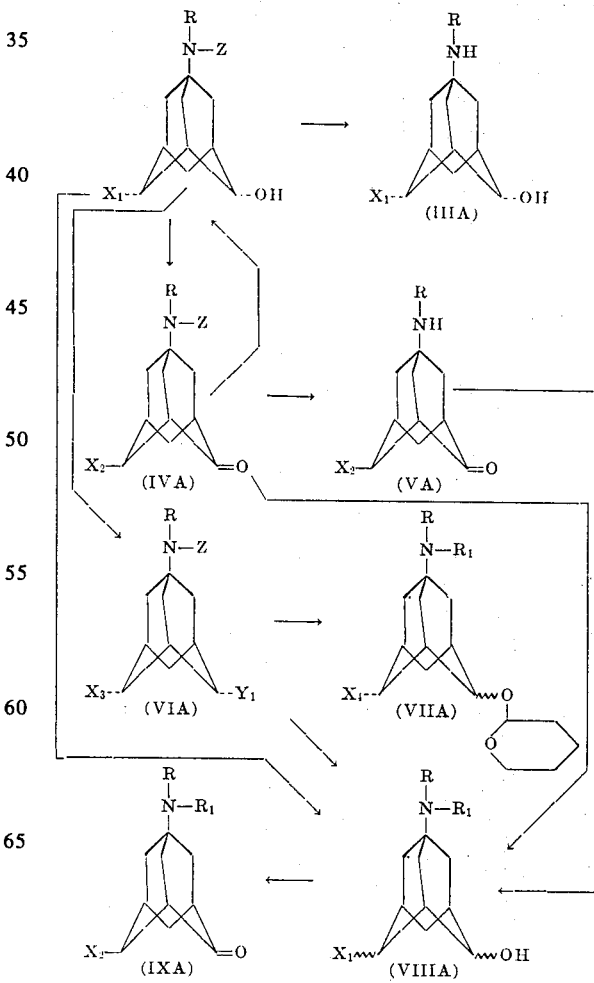

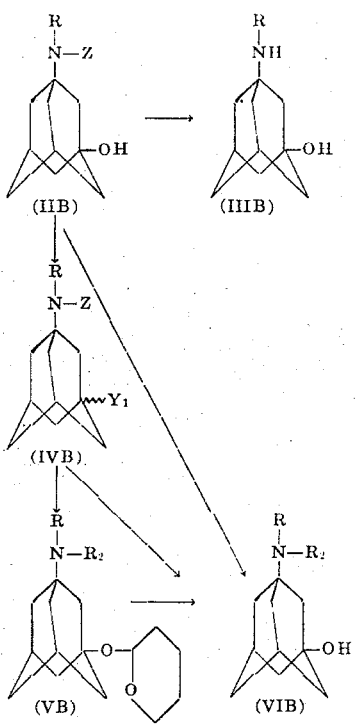

wherein $X_1$, R, $R_1$ and Z have the meanings hereinbefore given; $R_2$ is alkyl, aralkyl or cycloalkylmethyl, as hereinbefore defined; $X_2$ is hydrogen or keto; $X_3$ is hydrogen,

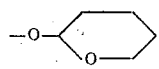

or acyloxy, as hereinbefore defined, $X_4$ is hydrogen or

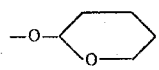

and $Y_1$ is hydroxy,

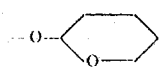

or acyloxy, as hereinbefore defined.

The 1-amidoadamantan-4-ols and 1-amidoadamantane-4,6-diols of Formula (IIA) can be oxidized to obtain the corresponding 1-amidoadamantan-4-ones and 1-amidoadamantane-4,6-diones of Formula (IVA) in accordance with methods known in the art for oxidizing secondary hydroxy groups to ketones, for example, Fieser and Fieser, Natural Products Related to Phenanthrene, 3rd Ed., pages 127–129, 193 and 194, Reinhold Publishing Corporation, New York, New York. Thus, the selected compound of Formula (IIA) is dissolved in an inert organic solvent such as acetone, benzene, methylene chloride, t-butanol, and the like, and then oxidized with aqueous chromic acid, potassium permanganate, t-butyl hypochlorite or like oxidizing agents to convert the hydroxy group to keto. The 1-amidoadamantan-4-ones and 1-amidoadamantane-4,6-diones (IVA) thus obtained, can be recovered from the reaction mixture and purified by conventional methods. For example, extraction with an organic solvent, e.g., methylene chloride followed by recrystallization from a suitable organic solvent, e.g., acetone, benzene, methylene chloride and the like.

The 1-amidoadamantan-4-ols (IIA), the 1-amidoadamantan-4-ones (IVA) and the 1-amidoadamantan-3-ols (IIB) can be converted to 1-aminoadamantan-4-ol (IIIA), 1-aminoadamantan-4-one (VA), and 1-aminoadamantan-3-ol (IIIB), respectively, in accordance with methods known in the art, for example, Chem. Ber. 93, 229 (1960) which shows the hydrolysis of 1-acetoadamantane to 1-aminoadamantane and preparation of the hydrochloride acid addition salt. The compounds of Formulas (IIA), (IVA) and (IIB) are preferably hydrolyzed with an aqueous strong base, such as sodium or potassium hydroxide at reflux temperature until hydrolysis is complete. The free amines thus obtained are recovered from the reaction mixture by extraction with a suitable organic solvent such as ether, methylene chloride, benzene, hexane, mixtures of these solvents, and the like. The free amine can be further purified by crystallization from a solvent such as ether, ether hexane, benzene, and the like. Alternatively, the hydrolysis can be carried out using a strong acid. In these instances the acid addition salt of the amine is obtained.

The 1-amidoadamantanols of the Formulas (IIA) and (IIB) can in some instances be reduced directly to the compounds of Formulas (VIIIA) and (VIB), respectively, by the use of known methods, for example, using lithium aluminum hydride. In cases where their reduction does not proceed due to complexing of the free hydroxyl group or groups of the starting adamantanol with the reducing agent, the compounds of Formulas (IIA) and (IIB) can be reacted with a hydroxyl protecting agent, such as dihydropyrane or an acylating agent to obtain the corresponding tetrahydropyranyl ether or corresponding acyl derivative of Formulas (VIA) and (IVB), respectively. Thus, the selected hydroxy-1-amidoadamantane is reacted with dihydropyran in the presence of an acid catalyst such as boron trifluoride etherate, p-toluenesulfonic acid, sulfuric acid, hydrochloric acid, and the like. Advantageously, the reaction is carried out in the presence of an organic solvent, such as ether, benzene, and the like. The reaction is carried out at temperatures of from 0° to 80° C., with a temperature of about 25° C. being preferred. The acyl derivatives are prepared in the same manner as hereinafter described.

The tetrahydropyranyl ether derivatives of the compounds of Formulas (VIA) and (IVB) can then be reduced in accordance with methods known in the art for reducing amides to amines to obtain the corresponding 1-aminoadamantane tetrahydropyranyl ethers of Formulas (VIIA) and (VB), respectively. The reduction is preferably carried out using lithium aluminum hydride as the reducing agent. The reduction reaction is carried out in the presence of an inert organic solvent such as ether, tetrahydrofuran, benzene, diglyme, combination thereof and the like. The reduction reaction is preferably conducted at reflux temperature and a period of about 1 to about 4 hours is generally sufficient for completion of the reaction.

The removal of the tetrahydropyranyl ether group is carried out by treating the compounds of Formulas (VIIA) and (VB) with an acid in the presence of an organic solvent to obtain the compounds of Formulas (VIIIA) and (VIB), respectively, as acid addition salts of the acid used. Preferably the acid is a mineral acid, such as hydrochloric, hydrobromic, sulfuric acids, and the like. Suitable solvents are acetone-water, methanol-water, ethanol-water, dimethylsulfoxide-water, dimethylformamide-water, and the like. The reaction is conveniently carried out at temperatures of about 10°C. to the reflux temperature of the reaction mixture until hydrolysis is complete. The acid addition salts of the compounds of Formulas (VIIIA) and (VIB), thus obtained are recovered from the reaction mixture and purified by conventional methods, or the amine salt can be treated with a base such as sodium or potassium hydroxide and the free amine can be recovered from the reaction mixture by the similar conventional methods, such as extraction with a suitable organic solvent followed by crystallization.

Alternatively the acylates of Formulas (VIA) and (IVB) can be reduced directly to the compounds of Formulas (VIIIA) and (VIB), respectively, as hereinbefore described for the dihydropyranyl ether derivatives, thus avoiding the hydrolysis step since the acyl radical is removed during the reduction.

The 1-amidoadamantanones of Formulas (IVA) and (VA) can be selectively reduced at the keto group(s) by methods known in the art, for example, using sodium or potassium borohydride to obtain a mixture of $\alpha$ and $\beta$ forms of the corresponding 1-amidoadamantanols of Formula (VIIIA), which can be separated by conventional methods such as chromatography, crystallization and the like. Alternatively, the compounds of Formula (IVA) can also be reduced at both the keto group(s) and the amido group by known methods, for example, using lithium aluminum hydride to obtain a mixture of $\alpha$ and $\beta$ forms of the compounds of Formula (VIIIA), wherein $R_1$ is hydrogen. These $\alpha$ and $\beta$ isomers can be separated and purified by conventional methods, such as chromatography, crystallization, and the like.

The compounds of Formula (VIIIA), thus obtained can be oxidized using an Oppenauer oxidation, for example, using a ketone, such as acetone or cyclohexanone and an aluminum alkoxide, such as aluminum isopropoxide in an organic solvent, e.g., benzene or toluene to obtain the corresponding 1-aminoadamantan-4-ones and 1-amidoadamantane-4,6-diones of Formula (IXA). The compounds of Formula (IXA) are recovered from the reaction mixture by conventional methods, for example, first neutralizing or acidifying the reaction mixture with a mineral acid, e.g., hydrochloric acid extracting the mixture thus obtained with a suitable organic solvent, e.g., benzene, toluene, ether, methylene chloride and the like, to remove organic impurities. The aqueous layer is then made basic, for example, with sodium or potassium hydroxide and the product (IXA) is extracted with ether or other suitable organic solvent, the solvent is removed by evaporation or distillation and the product purified by crystallization.

Alternatively, the compounds of Formula (IXA) can be obtained directly from the compounds of Formula (IVA) by protecting the keto group with a cyclic alkylene ketal in accordance with methods known in the art and then following the procedure described hereinabove for reducing the compounds of Formula (VIA) to (VIIA). The ketal group is removed by acid hydrolysis in the same manner as described hereinabove for hydrolysis of the tetrahydropyranyl ether group.

The free amines of Formulas (IIIA), (VA), (VIIIA), (IXA), (IIIB) and (VIB) of this invention can be converted by known methods to their pharmacologically acceptable acid addition salts by treating the selected amine with the appropriate acid, for example, those acids hereinbefore listed, in the presence of an inert solvent such as methanol, ethanol, diethyl ether, ethyl acetate, and the like.

The compounds of Formulas (IIA), (IIB) (VIIIA) and (VIB) can be converted to the corresponding acyl derivatives thereof in accordance with methods known in the art for acylating secondary and tertiary hydroxy groups. For example, the compounds of Formula (IIA) are acylated at the 4-position by reaction with the appropriate acid anhydride or acid halide, by reaction with the appropriate ester or by reaction with the appropriate acid in the presence of an esterification catalyst, for example, p-toluenesulfonyl chloride, trifluoroacetic anhydride, p-toluenesulfonic acid, trifluoroacetic acid, sulfuric acid, and the like. The tertiary hydroxy compounds of Formula (IIB) are acylated using more vigorous acylation procedures, for example, the selected 1-amidoadamantan-3-ol (IIB) is heated with the selected acid anhydride in the presence of an alkali earth carbonate, e.g., calcium carbonate until the reaction is complete. Suitable acylating agents are organic carboxylic acids, particularly hydrocarbon carboxylic acids containing from one to 12 carbon atoms, such as those hereinbefore listed, or acid anhydrides or acid halides thereof.

The $4\alpha,6\alpha\alpha$-diols of Formulas (IIA), (IIIA), and (VIIIA) can be converted to certain cyclic addition compounds, such as sulfites, carbonates and phosphates and the like, in accordance with methods known in the art. For example, the selected $4\alpha,6\alpha$-diol can be reacted with thionyl chloride to give the corresponding cyclic sulfite, with phosgene to give the corresponding cyclic carbonate, or with phosphorous oxychloride to give the corresponding cyclic phosphate. These cyclic addition compounds, like the parent compounds are useful as central nervous system stimulants. They have the additional advantage in that they can be used as slow releasing agents which give the parent compounds on hydrolysis in vivo.

The compounds of Formulas (IVA), (VA), and (IX-A), can be converted to their common carbonyl derivatives such as oximes, hydrazones, semicarbazones, cyclic alkylene ketals and the like in accordance with methods well known in the art. For example, the carbonyl group can be ketalized by reacting the selected compound with an alkanediol selected from the group of vicinal alkane-1,2-diols and alkane-1,3-diols containing up to and including eight carbon atoms, e.g., ethylene, propylene, trimethylene, 2,3-butylene, 2,4-pentylene, 4-methyl-1,2-pentylene, 1,3-hexylene, 1,2-heptylene, 3,4-heptylene, 1,3-octylene, and the like, preferably in an organic solvent such as benzene, toluene, xylene, methylene chloride, and the like and in the presence of an acid catalyst such as p-toluenesulfonic acid. The reaction is conducted at a temperature between about 20° and about 200°C., preferably between about 40° and about 150°C. The time required for the reaction is not critical and may be varied between about 1 and 48 hours, depending on the temperature. The ketonic derivatives, the oximes, etc., can be prepared in accordance with known methods as described in identification of Organic Compounds, Shriner and Fuson, John Wiley and Sons, Inc., New York, New York.

The acylates, cyclic alkylene ketals, oximes and other ketonic derivatives of the compounds of this invention can, if desired, be hydrolyzed in accordance with methods known in the art, for example, using aqueous acids or bases to give the corresponding free-hydroxy and free-keto compounds.

DETAILED DESCRIPTION

The following preparations and examples are intended to illustrate the process and products of this invention. The examples are for the purpose of illustrating the best mode contemplated of carrying out the invention and to supplement the foregoing disclosure of the invention with additional descriptions of the manner and process of carrying out the invention so as to further enable workers skilled in the art to do so, but they are not to be construed as limiting.

Preparation 1    1-benzamidoadamantane.

Two grams of 1-aminoadamantane hydrochloride, 20 ml. of 10 percent aqueous sodium hydroxide and 2.0 ml. of benzoyl chloride were vigorously mixed for a period of about 20 minutes; an additional 1.0 ml. of benzoyl chloride was then added and stirring was continued at room temperature (about 25°C.) for an additional period of about 1 hour. The precipitated product thus obtained was recovered by filtration washed with water and dried to give 2.65 g. of 1-benzamidoadamantane, m.p. 144°–146°C. An analytical sample prepared by recrystallization of the product from aqueous acetone gave 1-benzamidoadamantane; m. p. 148°–149°C.

In like manner following the procedure of Preparation 1, above, but substituting other monobasic hydrocarbon carboxylic acid halides such as those of the acids hereinbefore listed, in place of benzoyl chloride is productive of the corresponding 1-amidoadamantanes of Formula (I) for example those prepared and listed in Preparation 2, below.

Preparation 2    1-acetamidoadamantane.

A mixture of 2 g. of 1-aminoadamantane and 1.0 ml. of acetic anhydride is heated at 30°–100°C. for about 60 minutes and then 50 ml. of water is added and stirring is continued for an additional period of about 1 hour. The reaction mixture is extracted with ether and the ether layer is separated, washed with dilute aqueous sodium hydroxide solution, water, dried on anhydrous sodium sulfate and the ether is removed by evaporation. The residue thus obtained is recrystallized from ether to give 1-acetamidoadamantane.

In the manner substituting acetyl chloride for acetic anhydride in Preparation 2 is productive of 1-acetamidoadamantane.

In like manner substituting in the procedure of Preparation 2 the acid anhydrides or acid halides of other monobasic hydrocarbon carboxylic acids, such as the anhydrides or halides of those acids hereinbefore listed, in place of acetic anhydride is productive of the corresponding 1-amidoadamantanes of Formula (I). For example using the following acid anhydrides and acid halides:

propionic anhydride,
butyric anhydride,
valeric anhydride,
caproic anhydride,
decanoic anhydride,
dodecanoic anhydride,
cyclopropanecarbonyl chloride,
cyclohexanecarbonyl chloride,
toluyl chloride,
naphthoyl chloride,
p-ethylbenzoyl chloride,
phenylacetyl chloride,
stearoyl chloride, and the like, there is respectively obtained 1-propionamidoadamantane,
1-butyramidoadamantane,
1-valeramidoadamantane,
1-hexanamidoadamantane,
1-decanamidoadamantane,
1-dodecanamidoadamantane,
1-cyclopropanecarboxamidoadamantane,
1-cyclohexanecarboxamidoadamantane,
1-toluamidoadamantane,
1-napthamidoadamantane,
1-(p-ethylbenzamido)adamantane,
1-phenylacetamidoadamantane,
1-stearamidoadamantane, and the like.

Preparation 3    1-formamidoadamantane.

A mixture of 2.0 g. of 1-aminoadamantane and 3.0 ml. of 98 percent formic acid is heated at 130°–135°C. for 2 hours and then cooled. The reaction mixture is taken up in ether, filtered, and the ether filtrate washed with dilute hydrochloric acid, 5 percent aqueous sodium bicarbonate solution and dried over sodium sulfate. The solvent is removed by evaporation and the residue crystallized from ether-hexane to give crystalline 1-formamidoadamantane, m.p. 139°–140°C.

Preparation 4    N-methyl-1-benzamidoadamantane

Seventy grams of 1-formamidoadamantane dissolved in 700 ml. of dry tetrahydrofuran was added with stirring to suspension of 40 g. of lithium aluminum hydride in 2,000 ml. of dry ether. The mixture was then heated at reflux for 4 hours. After chilling in an ice-acetone bath 150 ml. of water was cautiously added to the stirred mixture. The solids were removed by filtration and washed well with ether. The combined filtrate and wash was dried over magnesium sulfate and treated with ether containing one equivalent of hydrogen chloride. The solid salt thus obtained was recovered by filtration, washed with ether and dried to give 66.0 g. of N-methyl-1-adamantanamine hydrochloride; m.p. 248°–250°C. The analytical sample recrystallized from methanol-methyl ethyl ketone melted at 250°C.

Anal. Calcd. for $C_{11}N_{20}NCl$: C, 65.49; H, 9.99; N, 6.94; Cl, 17.58.

Found: C, 65.32; H, 10.25; N, 6.86; Cl, 17.55.

A mixture of 25.0 g. of the N-methyl-1-adamantanamine hydrochloride, 250 ml. of 10 percent sodium hydroxide solution, and 25.0 ml. of benzoyl chloride chilled at 0° was stirred vigorously for 2 hours. The product was recovered by filtration, washed with water, dried to give 28.12 g. of N-methyl-1-benzamidoadamantane, m.p. 117°–119°C; an analytical sample recrystallized from aqueous acetone melted at 117°–119°C.

Anal. Calcd. for $C_{18}H_{23}NO$: C, 80.25; H, 8.61; N, 5.20.

Found: C, 80.03; H, 8.69; N, 5.30.

Preparation 5   N-methyl-1-acetamidoadamantane

A solution of 6.5 g. of N-methyl-1-adamantanamine hydrochloride in 100 ml. of water was treated dropwise with a slight excess of 50 percent aqueous sodium hydroxide solution. The precipitated free base was recovered by filtration, washed with water, and dried; yield, 5.49 g.

The free base was dissolved in 25 ml. of pyridine; 5 milliliters of acetic anhydride was allowed to stand at 25° C. for 56 hours. After diluting with 100 ml. of water and chilling the product was recovered, washed well with water and dried to give 3.65 g. of N-methyl-1-acetamidoadamantane; m. p. 123°–124°C.

Preparation 6   N-Methyl-1-cyclohexylcarboxamidoadamantane

A mixture of 20.0 g. of N-methyl-1-adamantanamine hydrochloride and 200 ml. of 10 percent aqueous sodium hydroxide solution was chilled at 5° and treated with 20 ml. of cyclohexane carbonyl chloride during 120 minutes with vigorous stirring. The mixture was extracted with methylene chloride, the extract washed with water, dilute hydrochloric acid, 5 percent sodium bicarbonate solution and dried over sodium sulfate. Evaporation of the solvent gave 20.20 g. of N-methyl-1-cyclohexylcaboxamidoadamantane; an analytical sample recrystallized from aqueous methanol melted at 91°–93C.

Anal. Calcd. for $C_{18}H_{29}NO$: C, 78.49; H, 10.61; N, 5.09

Found: C, 78.29; H, 10.90; N, 5.04.

Preparation 7   1-Phenylacetamidoadamantane

A mixture of 20.0 g. of 1-adamantanamine hydrochloride, 40 ml. of 50 percent aqueous sodium hydroxide solution, 160 g. of ice and 20 ml. of phenylacetylchloride was stirred vigorously for 1 hour and allowed to stand for several hours. The product was recovered by filtration and washed with water and air dried to give 20.23 g. of 1-phenylacetamidoadamantane, m.p. 176°–179°C. an analytical sample recrystallized from acetone melted at 181°–183°C.

Anal. Calcd. for $C_{18}H_{23}NO$: C, 80.25; H, 8.61; N, 5.20.

Found: C, 79.89; H, 8.88; N, 5.04.

Preparation 8 N-1-adamantanephthalimidine

A mixture of 12.0 g. of N-1-adamantylphthalimide and 240 ml. of 1 M. borane in tetrahydrofuran was heated at reflux for 2 hours and then concentrated under reduced pressure to remove most of the solvent. Methanol (200 ml.) and 20 ml. of 2 N. hydrochloric acid was added and the mixture was concentrated in vacuo to 200 ml., chilled, and the product was recovered by filtration, washed with water and dried to give 9.884 g. of N-1-adamantanephthalimidine; m.p. 220°–221° C.; an analytical sample from methanol melted at 222°–223° C.

Anal. Calcd. for $C_{18}H_{21}NO$: C, 80.86; H, 7.92; N, 5.24.

Found: C, 81.44; H, 7.56; N, 5.31.

Example 1   Oxygenation of 1-acetamidoadamantane

A medium was prepared of 40 g. of cornsteep liquor (60 percent solids), 20 g. of commercial dextrose diluted to 1 liter with tap water and adjusted to a pH of between 4.8 and 5.0. One ml. of UCON LB 625 (Union Carbide) was added as an antifoam agent. One hundred liters of this medium was sterilized and inoculated with 72-hour vegetative growth of Sporotrichum sulfurescens, ATCC 7159, and incubated at about 28° C. with aeration at about 5 l. per minute and stirring at about 300 r.p.m. After about 43 hours, or when a moderate to heavy growth of mycelium was apparent, 250 ml. of ULRAWET DS 30 (ARCO Chemical Co.) and a solution of 55 g. of 1-acetamidoadamantane in about 500 ml. of N,N-dimethylformamide was added to the fermentation. After an additional 72-hour period of incubation, 1,500 g. of diatomaceous earth (Celite) was added and the beer and mycelium were separated by filtration.

The beer thus obtained, was passed over a carbon column containing 3 kilograms of granular carbon (Pittsburg Chemical Co.). The column was prepared by heating the granular carbon in deionized water at 80°–90 C., cooling it and wet packing it into the column.

The column was eluted with 50 l. of methanol. The eluate containing the desired products was concentrated under reduced pressure to dryness. The residue was well stirred with 400 ml. of methanol and filtered to remove insoluble debris. The methanol filtrate was thoroughly mixed with 500 g. of silica gel (0.05 – 0.20 millimicrons) and air dried on a tray. The air dried material was then added to the top of a wet packed (ethyl acetate) silica gel column. The column was first eluted with 6 liters of ethyl acetate and then with ethyl acetate containing increasing proportions of methanol, 2 to 18 percent. One liter fractions were collected.

The fraction containing 1-acetamidoadamantan-4α-ol, determined by thin layer chromatographic analysis, were combined and the solvent was removed by distillation at reduced pressure. The residue thus obtained was recrystallized from acetone giving 19.19 g. of 1-acetamidoadamantan-4α-ol, m.p. 173°–175°C., infrared and N.M.R. analysis confirmed the structure:

Anal. Calcd. for $C_{12}H_{18}NO_2$: C, 68.86; H, 9.15; N, 6.69.

Found: C, 68.87; H, 9.22; N, 6.83.

The fractions containing 1-acetamidoadamantan-3-ol, determined by thin layer chromatography, were likewise combined, the solvent removed and the residue recrystallized from acetone to give 5.08 g. of 1- acetamidoadamantan-3-ol, m. p. 223°–225°C., infrared and N.M.R. analysis confirmed the structure:

Anal. Calcd. for $C_{12}H_{18}NO_2$: C, 68.86; H, 9.15; N, 6.69

Found: C, 69.00; H, 9.11; N, 6.82.

The other fractions which contained mixtures of the desired products and the mother liquors from the above recrystallizations were rechromatographed over silica gel giving an additional 4.23 g. of 1-acetamidoadamantan-4α-ol and an additional 2.30 g. of 1-acetamidoadamantan-3-ol.

In the same manner *Rhizopus arrhizus*, ATCC 11145 or *Curvularia lunata*, ATCC 12017, can be used in place of *Sporotrichum sulfurescens* to obtain 1-acetamidoadamantan-3-ol and 1-acetamidoadamantan-4α-ol.

In the same manner following the procedure of Example 1, other 1-amidoadamantanes of Formula (I) can be substituted as the substrate in place of 1-acetamidoadamantane to obtain the corresponding 1-amidoadamantan-4-ols and 1-amidoadamantan 3-ols of Formulas (IIA) and (IIB), respectively.

The following conversions are representative:
1-formamidoadamantane to 1-formamidoadamantan 4α-ol and 1-formamidoadamantan-3-ol;
1-benzamidoadamantane to 1-benzamidoadamantan-4α-ol and 1-benzamidoadamantan-3-ol;
1-propionamidoadamantane to 1-propionamidoadamantan-4α-ol and 1-propionamidoadamantan-3-ol;
1-butyramidoadamantane to 1-butyramidoadamantan-4α-ol and 1-butyramidoadamantan-3-ol;
1-valeramidoadamantane to 1-valeramidoadamantan-4α-ol and 1-valeramidoadamantan-3-ol;
1-hexanamidoadamantane to 1-hexanamidoadamantan-4α-ol and 1-hexanamidoadamantan-3-ol;
1-decanamidoadamantane to 1-decanamidoadamantan-4α-ol and 1-decanamidoadamantan-3-ol;
1-dodecanamidoadamantane to 1-dodecanamidoadamantan-4α-ol and 1-dodecanamidoadamantan-3-ol;
1-cyclopropanecarboxamidoadamantane to 1-cyclopropanecarboxamidoadamantan-4α-ol and 1-cyclopropanecarboxamidoadamantan-3-ol;
1-cyclohexanecarboxamidoadamantane to 1-cyclohexanecarboxamidoadamantan-4α-ol and 1-cyclohexanecarboxamidoadamantan-3-ol;
1-toluamidoadamantane to 1-toluamidoadamantan-4α-ol and 1-toluamidoadamantan-3-ol;
1-naphthamidoadamantane to 1-naphthamidoadamantan-4α-ol and 1-naphthamidoadamantan-3-ol;
1-(p-ethylbenzamido)adamantane to 1-(p-ethylbenzamido)-adamantan-4α-ol and 1-(p-ethylbenzamido)adamantan-3-ol;
1-(phenylacetamido)adamantane to 1-(phenylacetamido)adamantan -4α-ol and 1-(phenylacetamido)adamantan-3-ol; and
1-stearamidoadamantane to 1-stearamidoadamantan-4α-ol and 1-stearamidoadamantan-3-ol.

Example 2  Oxygenation of 1-Benzamidoadamantane

Ten liters of sterilized medium of the same composition as used in Example 1 was incoluated with 72-hour vegetative growth of *Sporotrichum sulfurescens*, ATCC 7159, and incubated at about 28° C. with aeration at 0.5 l. per minute and stirring at 300 r.p.m. After 24 to 48 hours, or when a moderate to heavy growth of mycelium was apparent, a solution of 25 ml. of ULTRAWET DS 30 and 2 g. of 1-benzamidoadamantane in 20 ml. of N,N-dimethylformamide was added to the fermentation. After an additional 72-hour period of incubation, the beer and mycelium were extracted with 10 l. of methylene chloride. The extracts were filtered, dried over sodium sulfate, concentrated to 75 ml. and chromatographed on synthetic magnesium silicate (Florisil). Elution with hexanes (Skellysolve B) containing increasing proportions of acetone gave 0.51 g. of 1-benzamidoadamantan-4α-ol. The crude product thus obtained was recrystallized from acetone-hexanes (Skellysolve B) giving 0.42 g. of 1-benzamidoadamantan-4 α-ol, m.p. 178°–181° C.

Anal. Calcd. for $C_{17}H_{21}NO_2$: C, 75.24; H, 7.80; N, 5.16.

Found: C, 75.15; H, 7.71; N, 5.30.

Thin layer chromatographic analysis of the mother liquors showed the presence of 1-benzamidoadamantan-3-ol.

Example 3  Oxygenation of 1-Acetamidoadamantane

The bioconversion and extraction procedures of Example 1 were carried out on a smaller scale using 10 liters of sterilized medium of the same composition, 4.0 g. of 1-acetamidoadamantane as the substrate and the microorganism *Rhizopus arrhizus* ATCC 11145. Paper and thin layer chromatographic analysis of the eluates showed the presence of 1-acetamidoadamantan-4-ol and 1-acetamidoadamantan-3-ol.

Example 4  Oxygenation of 1-Acetamidoadamantane

The bioconversion and extraction procedures of Example 1 were carried out on a smaller scale using 10 liters of sterilized medium of the same composition, 4.0 g. of 1-acetamidoadamantan as the substrate and the microorganism *Curvularia lunata*, ATCC 12017. Paper and thin layer chromatographic analysis of the eluates showed the presence of 1-acetamidoadamantan-4-ol and 1-acetamidoadamantan-3-ol.

Example 5  Oxygenation of N-methyl-1-Benzamidoadamantane

One hundred liters of sterilized medium of the same composition as used in Example 1 was inoculated with 72-hour vegetative growth of *Sporotrichum sulfurescens*, ATCC 7159, and incubated at about 28° C. with aeration at 5 l. per minute and stirring at 300 r.p.m. After 24 to 48 hours, or when a moderate to heavy growth of mycelium was apparent, 250 ml. of ULTRAWET DS 30 and a solution of 18 g. of N-methyl-1-benzamidoadamantane in about 200 ml. of N,N-dimethylformamide was added to the fermentation. After an additional 72-hour period of incubation, the beer and mycelium were extracted with 100 l. of methylene chloride. The extracts were filtered, dried over sodium sulfate and evaporated to remove the solvent. The residue thus obtained was chromatographed on a column of 700 g. of Florisil. The residue was placed on the column with 850 ml. of methylene chloride followed by gradient elution in fractions of 350 ml. each with 8 l. of solvent, Skellysolve B hexanes containing increasing proportions of acetone from 10 to 70 percent. This was followed with 4 l. of hexanes plus 70 percent acetone and finally 4 l. of acetone.

The fraction residues were examined by infrared and thin layer chromatography. The fractions containing the monohydroxylated product were combined and recrystallized from aqueous acetone to give 2.84 g. of N-methyl-1-benzamidoadamantan-4α-ol, m.p. 170°–181° C.; $\gamma_{OH}$3400, $\gamma$ N-C=O in Nujol.

Anal. Calcd. for $C_{18}H_{23}NO_2$: C, 75.75; H, 8.12; N, 4.91.

Found: C, 75.77; H, 8.35; N, 4.90.

The fractions containing the dihydroxylated product were combined and recrystallized from aqueous methanol to give 10.39 g. of N-methyl-1-benzamidoadamantan-4α,6α-diol, m.p. 223°–226° C.; $\gamma_{OH}$3430, 3200, $\gamma_{N-C=O}$ 1590, 1570 in Nujol.

Anal. Calcd. for $C_{18}H_{23}NO_3$: C, 71.73; H, 7.69; N, 4.65.

Found: C, 71.87; H, 8.02; N, 4.81.

Example 6 Oxygenation of N-methyl-1-benzamidoadamantan-4α-ol

The bioconversion and extraction procedures of Example 2 were repeated using 2.0 g. of N-methyl-1-benzamidoadamantan-4α-ol as the substrate. The methylene chloride extracts thus obtained were combined, filtered, dried over sodium sulfate and chromatographed over 150 g. of silica gel. The column was eluted in 50 ml. fractions with ethyl acetate which had been saturated with water. The fractions which contained the dihydroxylated product were pooled and recrystallized from methanol-water to give 0.76 g. of N-methyl-1-benzamidoadamantan-4α,6α-diol, m.p. 223°–226° C. The infrared spectrum and mixed melting point showed the product to be identical to that of the diol described in Example 5, above.

Example 7 Oxygenation of N-methyl-1-acetamidoadamantane

The bioconversion and extraction procedures of Example 2 were repeated using 2.0 g. of N-methyl-1-acetamidoadamantane as the substrate. The methylene chloride extracts thus obtained were combined, dried over sodium sulfate and evaporated to dryness. The residue thus obtained was dissolved in methylene chloride and chromatographed over 100 g. of Florisil. Elution was by the gradient method in cuts of 100 ml. each using 4 l. of solvent, Skellysolve B hydrocarbons containing increasing proportions of acetone from 0 to 30 percent. The fractions containing the 4-hydroxylated product, as determined by thin layer chromatography on the fraction residues were combined and recrystallized from acetonehexane to give 0.717 g. of N-methyl-1-acetamidoadamantan-4α-ol, m.p. 151°–154° C.; $\gamma_{OH}$3360, $\gamma_{N-C=O}$1610 in Nujol.

Anal. Calcd. for $C_{13}H_{21}NO_2$: C, 69.92; H, 9.48; N, 6.27.

Found: C, 70.09; H, 9.57; N, 6.36.

The fractions containing the 3-hydroxylated product, as determined by thin layer chromatography were combined and recrystallized from acetone-hexane to give 0.140 g. of N-methyl-1-acetamidoadamantan-3-ol, m.p. 155°–156° C.; $\gamma_{OH}$3310, $\gamma_{N-C=O}$1610 in Nujol.

Anal. Calcd. for $C_{13}N_{21}NO_2$: C, 69.92; H, 9.48; N, 6.27.

Found: C, 69.95; H, 9.26; N, 6.24.

Example 8 Oxygenation of N-methyl-1-cyclohexylcarboxamidoadamantane

The bioconversion and extraction procedures of Example 2 were repeated using 2.0 g. of N-methyl-1-cyclohexylcarboxamidoadamantane as the substrate.

The methylene chloride extracts thus obtained were chromatographed over 100 g. of Florisil. The column was eluted by the gradient method with 4 l. of solvent, Skellysolve B hydrocarbons containing increasing amounts of acetone from 0 to 40 percent. Cuts of 110 ml. each were collected and the residues were examined by thin layer chromatography. The fractions containing dihydroxylated products were pooled and recrystallized from acetone to give 0.174 g. of N-methyl-1-cyclohexylcarboxamidoadamantan-4α,6α-diol, m.p. 190°–191° C.; $\gamma_{OH}$3400, $\gamma_{N-C=O}$1620 in Nujol.

Anal. Calcd. for $C_{18}H_{29}NO_3$: C, 70.32; H, 9.51; N, 4.56.

Found: C, 70.31; H, 9.51; N, 5.35.

The remaining fractions and mother liquors contained N-methyl-1-cyclohexylcarboxamidoadamantan-4α-ol.

Example 9 Oxygenation of 1-phenylacetamidoadamantane

The bioconversion and extraction procedures of Example 2 were repeated using 2.0 g. of N-phenylacetyl-1-adamantanamine as the substrate. The methylene chloride extracts thus obtained were combined, dried over sodium sulfate and evaporated to dryness. The residue thus obtained was triturated with 40 ml. of methylene chloride and filtered to obtain 1.05 g. of solid product which was combined with that obtained from the chromatography described below.

The filtrate was placed on a column of 100 g. of Florisil. Elution was by the gradient method 6 l. of solvent, Skellysolve B hydrocarbons plus increasing proportions of acetone from 0 to 60 percent. Cuts of 55 ml. each were collected. Fraction residues (0.36 g.) which were identical with the material obtained by direct isolation were combined with this material (1.41 g.) and recrystallized from acetone after treatment with activated carbon to give 1-phenylacetamidoadamantan-4α,6α-diol, m.p. 201°–202° C.; $\gamma_{OH,NH}$3300, $\gamma_{N-C=O}$1640, 1550 in Nujol.

Anal. Calcd. for $C_{18}H_{23}NO_3$: C, 71.73; H, 7.69; N, 4.65.

Found: C, 71.74; H, 7.94; N, 4.62.

Thin layer chromatography showed the presence of 1-phenylacetamidoadamantan-4α-ol in the mother liquors and in the other fractions.

Example 10 Oxygenation of N-1-adamantanephthalimide

The bioconversion procedure of Example 2 was repeated using 2.0 g. of N-1-adamantanephthalimide as the substrate. The mycelium was removed by filtration and the beer was poured over a column of 300 g. of granular carbon. The column was eluted first with 10 l. of methanol, followed with 5 l. of ethyl acetate, and finally 5 l. of chloroform. Thin layer chromatography showed that the chloroform eluate contained the dihydroxy product. The residue therefrom was chromatographed over 100 g. of Florisil. Elution was by the gradient method with 4 l. of solvent Skellysolve B plus increasing amounts of acetone from 0 to 40 percent; cuts were ca. 110 ml. each. The fractions containing the dihydroxylated product were recrystallized from acetone-hexane to give 4α,6α-dihydroxy-N-1-adamantanephthalimide, m.p. 218°–220° C.

Anal. Calcd. for $C_{18}H_{19}NO_4$: C, 68.99; H, 6.11; N, 4.47.

Found: C, 68.81; H, 6.39; N, 4.21.

Thin layer chromatography showed that the other fractions and the mother liquors contained 4α-hydroxy-N-1-adamantanephthalimide.

A small amount of a second dihydroxy product, m.p. 229°–231° C. was recovered from the higher fractions by recrystallization from acetone-hexane.

Anal. Calcd. for $C_{18}H_{19}NO_4$: C, 68.99; H, 6.11; N, 4.47.

Found: C, 68.93; H, 6.45; N, 4.51.

Example 11 Oxygenation of N-1-adamantanephthalimidine

The bioconversion and extraction procedures of Example 2 were repeated using N-1-adamantanephthalimidine as the substrate. The methylene chloride extracts were evaporated to dryness and the residue was triturated with methanol. The product thus obtained was recrystallized from aqueous acetic acid to give 4α,6α-dihydroxy-N-1-adamantanephthalimidine, m.p. 278°–280° C.

Anal. Calcd. for $C_{18}H_{21}NO_3$: C, 72.21; H, 7.07; N, 4.68.

Found: C, 72.32; H, 7.11; N, 4.83.

Example 12 1-acetamidoadamantan-4-one

A mixture of 2.45 g. of 1-acetamidoadamantan-4α-ol and about 150 ml. of acetone was treated dropwise, while maintaining the temperature below 40°, with chromic acid solution (prepared from 267 g. of chromic anhydride, 230 ml. of concentrated sulfuric acid, and water sufficient to make 1 l.) until a slight excess had been added. The mixture was stirred for 5 minutes; 5.0 ml. of isopropanol was added and the mixture concentrated under reduced pressure to about one-third volume, diluted with 100 ml. of water, and extracted several times with methylene chloride. The combined extracts were washed with water, dried over sodium sulfate, and concentrated to dryness to give 2.13 g. of 1-acetamidoadamantan-4-one. An analytical sample crystallized from acetone gave 1-acetamidoadamantan-4-one, m.p. 176°–178° C.

Anal. Calcd. for $C_{12}H_{17}NO_2$: C, 69.53; H, 8.27; N, 6.76.

Found: C, 69.88; H, 8.51; N, 6.79.

Example 13 N-methyl-1-benzamidoadamantane-4,6-dione

Two grams of the N-methyl-1-benzamidoadamantane-4α,6α-diol dissolved in acetone by heating was treated dropwise with a slight excess of chromic acid solution in the manner described in Example 12, above. The resulting product was recrystallized from aqueous methanol to give 1.70 g. of N-methyl-1-benzamidoademantane-4,6-dione; for spectral and elemental analysis a sample was dried at its melt temperature, 157°–160° C. to remove water of crystallization; $\gamma_{C=O}$1740, 1700, $\gamma_{N-C=O}$1620 in Nujol.

Anal. Calcd. for $C_{18}H_{19}NO_3$: C, 72.70; H, 6.44; N, 4.71.

Found: C, 72.79; H, 6.82; N, 5.07.

Example 14 N-methyl-1-benzamidoadamantan-4-one

Seventy milligrams of N-methyl-1-benzamidoadamantan-4α-ol dissolved in 10 ml. of acetone and oxidized with chromic acid by the method described in Example 12, above. The product thus obtained was recrystallized from aqueous acetone to give N-methyl-1-benzamidoadamantan-4-one, m.p. 126°–127° C.; $\gamma_{C=O}$1720, $\gamma_{N-C=O}$1620 in Nujol.

Anal. Calcd. for $C_{18}H_{21}NO_2$: C, 76.29; H, 7.47; N, 4.94.

Found: C, 76.13; H, 7.54; N, 5.07.

Example 15 N-methyl-1-acetamidoadamantan-4-one

Following the procedure of Example 12, above, N-methyl-1-acetamidoadamantan-4α-ol was oxidized to give N-methyl-1-acetamidoadamantan-4-one, m.p. 119°–120° C.; $\gamma_{C=O}$1740; $\gamma_{N-C=O}$1640 in Nujol.

In the same manner following the procedure of Examples 12, 13 and 14 but substituting other compound of Formula (IIA) as starting materials in place of 1-acetamidoadamantan-4α-ol is productive of the corresponding 1-amidoadamantan-4-ones of Formula (IVA), for example, using the other 1-amidoadamantan-4-ols prepared and listed in Example 1, above, there is respectively obtained:

1-formamidoadamantan-4-one,
1-benzamidoadamantan-4-one,
1-propionamidoadamantan-4-one,
1-butyramidoadamantan-4-one,
1-valeramidoadamantan-4-one,
1-hexanamidoadamantan-4-one,
1-decanamidoadamantan-4-one,
1-dodecanamidoadamantan-4-one,
1-cyclopropanecarboxamidoadamantan-4-one,
1-cyclohexanecarboxamidoadamantan-4-one,
1-toluamidoadamantan-4-one,
1-naphthamidoadamantan-4-one,
1-(p-ethylbenzamido)adamantan-4-one,
1-phenylacetamidoadamantan-4-one, and
1-stearamidoadamantan-4-one.

In the same manner other 4-ols and 4,6-diols can likewise be converted to the corresponding ketones, for example, N-methyl-1-cyclohexylcarboxamidoadamantan-4α,6α-diol to N-methyl-1-cyclohexylcarboxamidoadamantan-4,6-dione, N-phenylacetamidoadamantan-4α,6α-diol to 1-phenylacetamidoadamantan-4,6-dione, 4α,6α-dihydroxy-N-1-adamantanephthalimide to 4,6-dioxo-N-1-adamantanephthalimide, 4α,6α-dihydroxy-N-1-adamantanephthalimidine to 4,6-dioxo-N-1-adamantanephthalimidine, 1-acetamidoadamantan-4β-ol to 1-acetamidoadamantan-4-one, and the like.

Example 16 1-acetamidoadamantan-4-one oxime

A mixture of 1.25 g. of 1-acetamidoadamantan-4-one, 10.0 ml. of ethanol, 10.0 ml. of pyridine and 1.25 g. of hydroxy amine hydrochloride was heated at reflux for 2 hours. The mixture was then concentrated to dryness and the residue thus obtained was stirred with 5.0 ml. of water, chilled, and the solid product recovered by filtration, washed with 5 ml. of cold water and dried giving 1-acetamidoadamantan-4-one oxime, m.p. 197°–198° C.

Anal. Calcd. for $C_{17}H_{18}N_2O_2$: C, 64.84; H, 8.16; N, 12.61.

Found: C, 64.53; H, 8.11; N, 12.55.

In the same manner following the procedure of Example 16 but substituting as starting material other 1-amidoadamantan-4-ones of Formulas (IVA), (VA) or (IXA), for example, those prepared and listed in the foregoing examples, in place of 1-acetamidoadamantan-4-one is productive of the corresponding oxime derivatives, for example, N-methyl-1-benzamidoadamantan-4,6-diones to N-methyl-1-benzamidoadamantan-4,6-dione dioxime hydrate, m.p. 250° C. (dec.).

Anal. Calcd. for $C_{18}H_{21}N_3O_3 \cdot H_2O$: C, 62.59; H, 6.71; N, 12.17.

Found: C, 62.85; H, 6.65; N, 12.10.

Likewise, other carbonyl derivatives of these compounds can also be prepared, for example, N-methyl-1-benzamidoadamantan-4,6-dione was reacted with semicarbazide hydrochloride in the presence of a base to obtain N-methyl-1-benzamidoadamantan-4,6-dione disemicarbazone, m.p. 280° C. (dec.).

Anal. Calcd. for $C_{20}H_{25}N_7O_3$: C, 58.38; H, 6.12; N, 23.83.

Found: C, 58.15; H, 6.07; N, 23.42.

Example 17 1-aminoadamantan-4α-ol hydrochloride.

A mixture of 4.0 g. of 1-acetamidoadamantan-4α-ol, 160 ml. of ethylene glycol, and 16 g. of sodium hydroxide pellets was heated at reflux for 5 hours. After cooling and dilution with 200 ml. of water, the solution was extracted continuously with ether for 8 hours and the extract dried over sodium sulfate and potassium hydroxide.

The ether can be removed by evaporation or distillation to obtain 1-aminoadamantan-4α-ol, recrystallized from ether, m.p. 248°–250° C. in a sealed tube (oil bath).

The dried ether extract was treated with ethereal hydrogen chloride to precipitate the amine salt; yield, 2.60 g. of 1-aminoadamantan-4α-ol hydrochloride, m.p. >300° (dec.).

Anal. Calcd. for $C_{10}H_{17}NO \cdot HCl$:

C, 58.96; H, 8.90; N, 6.88; Cl, 17.41.

Found: C, 58.79; H, 8.82; N, 6.73; Cl, 17.32.

In the same manner substituting 1-acetamidoadamantan-4-one as starting material in Example 17 in place of 1-acetamidoadamantan-4α-ol is productive of 1-aminoadamantan-4-one and the hydrochloride thereof.

Example 18 1-aminoadamantan-3-ol and 1-aminoadamantan-3-ol hydrochloride.

A mixture of 300 mg. of 1-acetamidoadamantan-3-ol and 20 ml. of 10 percent aqueous sodium hydroxide solution was heated at reflux for 22 hours. The mixture was diluted with 10 ml. of water and extracted several times with ether. The ether extract was dried over potassium hydroxide and the solvent removed to give 220 mg. of crystalline 1-aminoadamantan-3-ol, a sample was recrystallized from ether-hexane, m.p. 267° C. in a sealed tube (oil bath).

A 100 mg. portion of the 1-aminoadamantan-3-ol thus obtained was dissolved in 50 ml. of ether and treated with ethereal hydrogen chloride to precipitate the hydrochloride salt which was recovered by filtration and recrystallized from methanol-methyl ethyl ketone to give 1-aminoadamantan-3-ol hydrochloride, m.p. >300° C.

Anal. Calcd. for $C_{10}H_{18}NOCl$: C, 58.96; H, 8.90; N, 6.80.

Found: C, 59.07; H, 9.05; N, 7.21.

Similarly, following the procedures of Examples 17 and 18, above, other 1-amidoadamantanes of Formulas (IIA), (IVA) and (IIB) can be converted to the corresponding 1-aminoadamantanes of Formulas (IIIA), (VA) and (IIIB), respectively, and the hydrochloride acid addition salts thereof.

In the same manner following the procedures of Examples 17 and 18, other pharmacologically acceptable acids, such as those hereinbefore named, can be used in place of hydrogen chloride to obtain the corresponding acid addition salts of 1-aminoadamantan-4α-ol, 1-aminoadamantan-4-one and 1-aminoadamantan-3-ol.

Example 19 1-(ethylamino)adamantan-4α-ol hydrochloride.

To a mixture of 1.0 g. of 1-acetamindoadamantan-4α-ol, 30 ml. of dihydropyran and 30 ml. of tetrahydrofuran was added two drops of concentrated hydrochloric acid. The mixture was allowed to stand at room temperature for about 96 hours. Thin layer chromatography at intervals indicated that it took this long for the reaction to go to completion. The solution was dried over sodium hydroxide and the solvent removed under reduced pressure to give a yellow oil.

The oil thus obtained was dissolved in 50 ml. of tetrahydrofuran, added to a stirred mixture of 2.0 g. of lithium aluminum hydride in 50 ml. of ether and heated at reflux for 90 minutes. The mixture was then chilled and treated cautiously with 15 ml. of water, diluted with ether and filtered. The filtrate was dried over magnesium sulfate and concentrated to an oil. The oil was dissolved in about 50 ml. of ethanol, and 5.0 ml. of water and 2.0 ml. of concentrated HCl were added. The mixture was then heated at reflux for 30 minutes. After making basic with 50 percent sodium hydroxide solution, the mixture was concentrated in vacuo, diluted with water, and extracted with ether. The ether solution was dried over magnesium sulfate and the insoluble salt of the amine separated as an oil by adding ethereal HCl. The oil thus obtained was crystallized from methanolacetone; yield, 0.355 g. of 1-(ethylamino)adamantan-4α-ol hydrochloride, m.p. 257°–260° C.

Anal. Calcd. for $C_{12}H_{21}NO \cdot HCl$:

C, 62.18; H, 9.57; N, 6.04; Cl, 15.30.

Found: C, 61.57; H, 9.79; N, 6.37; Cl, 14.75.

In the same manner following the procedure of Example 19, but substituting as starting material 1-acetamidoadamantan-3-ol, in place of 1-acetamindoadamantan-4α-ol, is productive of 1-(ethylamino)adamantan-3-ol hydrochloride.

Similarly, following the procedure of Example 19 the other 1-amidoadamantanes of Formulas (IIA) and (IIB) can be reduced to obtain the corresponding 1-aminoadamantane hydrochlorides of Formulas (VIIIA) and (VIB), respectively, for example, using the 1-amidoadamantan-3- and 4-ols prepared and listed in the last paragraph of Example 1, such as:

1-formamidoadamantan-4α-ol,
1-formamidoadamantan-3-ol,
1-benzamidoadamantan-4α-ol,
1-benzamidoadamantan-3-ol,
1-propionamidoadamantan-4α-ol,
1-propionamidoadamantan-3-ol,
1-butyramidoadamantan-4α-ol,
1-butyramidoadamantan-3-ol,
1-hexanamidoadamantan-4α-ol,
1-hexanamidoadamantan-3-ol,
1-dodecanamidoadamantan-4α-ol,
1-dodecanamidoadamantan-3-ol,
1-cyclohexanecarboxamidoadamantan-4α-ol,
1-cyclohexanecarboxamidoadamantan-3-ol,
1-phenylacetamidoadamantan-4α-ol, 1-phenylacetamidoadamantan-3-ol,
1-stearamidoadamantan-4α-ol,
1-stearamidoadamantan-3-ol,
and the like, there is respectively obtained
- 1-(methylamino)adamantan-4α-ol hydrochloride,
- 1-(methylamino)adamantan-3-ol hydrochloride,
- 1-(benzylamino)adamantan-4α-ol hydrochloride,
- 1-(benzylamino)adamantan-3-ol hydrochloride,
- 1-(propylamino)adamantan-4α-ol hydrochloride,
- 1-(propylamino)adamantan-3-ol hydrochloride,
- 1-(butylamino)adamantan-4α-ol hydrochloride,
- 1-(butylamino)adamantan-3-ol hydrochloride,
- 1-(hexylamino)adamantan-4α-ol hydrochloride,
- 1-(hexylamino)adamantan-3-ol hydrochloride,
- 1-(dodecylamino)adamantan-4α-ol hydrochloride,
- 1-(dodecylamino)adamantan-3-ol hydrochloride,
- 1-[(cyclohexylmethyl)amino]adamantan-4α-ol hydrochloride,
- 1-[(cyclohexylmethyl)amino]adamantan-3-ol hydrochloride,
- 1-(phenethylamino)adamantan-4α-ol hydrochloride,
- 1-(phenethylamino)adamantan-3-ol hydrochloride,
- 1-(octadecylamino)adamantan-4α-ol hydrochloride,
- 1-(octadecylamino)adamantan-3-ol hydrochloride, and the like.

Example 20  1-(ethylamino)adamantan-4α-ol.

One gram of 1-(ethylamino)adamantan-4α-ol hydrochloride and 20 ml. of 10 percent aqueous sodium, hydroxide solution is stirred and the mixture is extracted several times with ether. The ether extracts are dried over sodium hydroxide pellets and the solvent removed to obtain 1-(ethylamino)adamantan-4α-ol.

In the same manner other acid addition salts of the compounds of Formulas (VIIIA) and (VIB) such as the hydrochlorides listed in Example 19, above, can be converted to the corresponding free amines of Formulas (VIIIA) and (VIB), respectively.

Example 21  1-(ethylamino)adamantan-4-one.

A mixture of 1.0 gram of 1-(ethylamino)adamantan-4α-ol, 60 ml. of toluene, 15 ml. of cyclohexanone, and 2.0 g. of aluminum isopropoxide is distilled to remove 10 ml. of solvent and then heated at reflux for 60 minutes. The mixture is cooled and poured onto an ice-mixture containing excess hydrochloric acid. The mixture is stirred and the layers are separated. The aqueous layer is extracted several times with ether. The aqueous layer is then made basic by the addition of sodium hydroxide solution and the resulting gelatinous mixture is exhaustively extracted with ether; this ether extract is dried over potassium hydroxide and the solvent removed to leave a residue of 1-(ethylamino)adamantan-4-one which can be recrystallized, e.g., from ether-hexane.

In the same manner following the procedure of Example 21, other free amines of Formula (VIIA) can be substituted as starting material in place of 1-(ethylamino)adamantan-4-ol, for example,
- 1-(methylamino)adamantan-4α-ol,
- 1-(benzylamino)adamantan-4α-ol,
- 1-(propylamino)adamantan-4α-ol,
- 1-(butylamino)adamantan-4α-ol,
- 1-(hexylamino)adamantan-4α-ol,
- 1-[(cyclohexylmethyl)amino]adamantan-4α-ol,
- 1-(phenethylamino)adamantan-4α-ol,
- 1-(dodecylamino)adamantan-4α-ol,
- 1-(octadecylamino)adamantan-4α-ol, and the like, there is obtained
- 1-(methylamino)adamantan-4α-ol,
- 1-(benzylamino)adamantan-4α-ol,
- 1-(propylamino)adamantan-4-one,
- 1-(butylamino)adamantan-4-one,
- 1-(hexylamino)adamantan-4-one,
- 1-[(cyclohexylmethyl)amino]-4-one,
- 1-(phenethylamino)adamantan-4-one,
- 1-(dodecylamino)adamantan-4-one,
- 1-(octadecylamino)adamantan-4-one, respectively, and the like.

Example 22  1-(ethylamino)adamantan-4-one hydrochloride

A solution of 1 g. of 1-(ethylamino)adamantan-4-one in diethyl ether is treated with hydrogen chloride to obtain 1-(ethylamino)adamantan-4-one hydrochloride.

In the same manner the other free amines of Formulas (VIIIA), (IXA), and (VIB) for example, those listed in Examples 20 and 21, above, can be treated with hydrogen chloride to obtain the corresponding hydrochloride acid addition salts thereof.

Similarly, other pharmacologically acceptable acids such as those hereinbefore named can be used in place of hydrogen chloride to obtain the corresponding acid addition salts of the compounds of Formulas (VIIIA), (IXA) and (VIB).

Example 23  1-acetamidoadamantan-4-ol acetate

A mixture of 500 mg. of 1-acetamidoadamantan-4α ol, 5 ml. of pyridine, and 1 ml. of acetic anhydride is stirred at room temperature (about 25° C.) overnight. The excess anhydride is then hydrolyzed by the addition of ice and water and the product is extracted with methylene chloride. The extract is washed with dilute acid, dilute sodium bicarbonate, water, dried and concentrated in vacuo to give 1-acetamidoadamantan-4-ol acetate.

In the same manner substituting other acid anhydrides or acid halides of organic carboxylic acids, among which are hydrocarbon carboxylic acids of from 1 to 18 carbon atoms, inclusive, previously listed, is productive of the corresponding 1-acetamidoadamantan-4-ol acylate.

In the same manner following the procedure of Example 23 other compounds of Formula (IIA) for example, the 4-hydroxy compounds prepared and listed in Example 1, are converted to the corresponding 4-acylates by reacting the selected free 4-hydroxy compound with the appropriate acid anhydride or acid halide.

Example 24  1-acetamidoadamantan-3-ol acetate.

A mixture of 100 mg. of 1-acetamidoadamantan-3-ol, 100 mg. of calcium carbonate powder and 3 ml. of acetic anhydride is stirred and heated at 140° C. for a period of about 8 hours and then allowed to stand overnight. The mixture is diluted with water to hydrolyze the excess acetic anhydride. The product is extracted with methylene chloride and the extract washed with dilute sodium bicarbonate solution, water, dried and concentrated yielding 1-acetamidoadamantan-3-ol acetate.

In the same manner substituting in place of acetic anhydride other acid anhydrides or acid halides or organic carboxylic acids, among which are the hydrocarbon carboxylic acids of from one to 18 carbon atoms, inclusive, previously listed, is productive of the corresponding 1-acetamidoadamantan-3-ol acylate.

In the same manner following the procedure of Example 24, other compounds of Formula (IIB), for example the 3-hydroxy compounds prepared and listed in Example 1, are converted to the corresponding 3-acylates by reacting the selected free 3-hydroxy compound with the appropriate acid anhydride or acid halide.

Example 25  1-acetamidoadamantan-4α and 4β-ol

Two grams of 1-acetamidoadamantan-4-one dissolved in 25.0 ml. of methanol was treated with 1.0 g. of sodium borohydride dissolved in 6.0 ml. of N/10 sodium hydroxide solution and the mixture was allowed to stand at room temperature for 18 hours. The mixture was chilled at 0° C. and carefully treated dropwise with 50 percent acetic acid until a slight excess was present. The mixture was concentrated under reduced pressure and the residue was triturated with 50 ml. of tetrahydrofuran. The insoluble material was removed by filtration, the filtrate was chromatographed over a column of 100 g. of silica gel which had been prepared from a slurry of the silica gel in ethyl acetate-hexane (5:1). The column was eluted in cuts of 50 ml. each with the same solvent mixture. The fractions were examined by thin layer chromatography and fractions 21–28 (pool I) were combined as one isomer and fractions 41–79 (pool II) were combined as another isomer.

Pool I was recrystallized from methanol-benzene to yield 0.76 g. of 1-acetamidoadamantan-4α-ol, m.p. 176°–177° C. Infrared analysis and the mixed melting point showed the product to be identical to the 1-acetamidoadamantan-4α-ol obtained by bioconversion.

Pool II was recrystallized from methanol-benzene to yield 0.72 g. of 1-acetamidoadamantan-4β-ol, m.p. 206°–207° C.

Anal. Calcd. for $C_{12}H_{19}NO_2$: C, 68.86; H, 9.15; N, 6.69.

Found: C, 68.90; H, 9.17; N, 6.53.

In the same manner following the procedure of Example 25, other compounds of Formulas (IVA) and (VA) can likewise selectively be reduced at the 4- and 4,6-positions to obtain a mixture of the corresponding α- and β-isomeric forms thereof, which can be separated by chromatography, for example, N-methyl-1-benzamidoadamantan-4,6-dione to N-methyl-1-benzamidoadamantan-4α,6α-diol, N-methyl-1-benzamidoadamantan-4β,6β-diol and N-methyl-1-benzamidoadamantan-4β-ol; N-methyl-1-acetamidoadamantan-4-one to N-methyl-1-acetamidoadamantan-4α-ol and N-methyl-1-acetamidoadamantan-4β-ol; and the like.

EXAMPLE 26  N-benzyl-N-methyl-1-adamantanamine-4α,6α-diol hydrochloride

Four grams of N-methyl-1-benzamidoadamantan-4α,6α-diol was reduced with an ether mixture of 4.0 g. of lithium aluminum hydride. The low solubility of this material made it necessary to carry out the reaction in such a manner that warm ether was continuously extracting the starting material into the refluxing ether-hydride mixture. The mixture was then cooled to 0° C., treated with about 30 ml. of water, diluted with ether, filtered and dried over magnesium sulfate. The drying agent was removed and ethereal hydrogen chloride was added to precipitated and hydrochloride salt, which was recrystallized from methanol-methyl ethyl ketone to give 3.0 g. of N-benzyl-N-methyl-1-adamantanamine-4α,6α-diol hydrochloride, m.p. 267°–269° C.

Anal. Calcd. for $C_{18}H_{26}NO_2Cl$:
C, 66.75; H, 8.09; N, 4.33; Cl, 10.95.

Found: C, 66.71; H, 8.34; N, 4.36; Cl, 11.17.

EXAMPLE 27  N-benzyl-N-methyl-1-adamantanamine-4α-ol

Four grams of N-methyl-1-benzamidoadamantan-4α-ol in 150 ml. of dry tetrahydrofuran was added with stirring to a mixture of 3.0 g. of lithium aluminum hydride in 100 ml. of anhydrous ether. The mixture was heated at reflux for 150 minutes; a cold bath was applied, and 20 ml. of water was added with caution and stirring was continued for 30 minutes. The mixture was filtered and the insoluble material was washed well with ether. The filtrate and wash was dried over magnesium sulfate and the solvent removed to give 3.36 g. of N-benzyl-N-methyl-1-adamantanamine-4α-ol; a sample was recrystallized from ether-hexane for analysis, m.p. 119°–120° C.

Anal. Calcd. for $C_{18}H_{25}NO$: C, 79.66; H, 9.29; N, 5.16.

Found: C, 79.44; H, 9.10; N, 5.07.

EXAMPLE 28  N-methyl-1-adamantanamine-4α-ol and the hydrochloride

Three grams of N-benzyl-N-methyl-1-adamantanamine-4α-ol was dissolved in 60 ml. of ethanol. One-half gram of 10 percent palladium on carbon catalyst was added and the mixture was shaken with hydrogen (42 p.s.i.g.) for 150 minutes. The mixture was freed of catalyst and concentrated to dryness under reduced pressure to a solid residue. A 1.0 g. sample was recrystallized from ether to give N-methyl-1-adamantanamine-4α-ol m.p. 141°–142° C.

Anal. Calcd. for $C_{11}H_{19}NO$: C, 72.88; H, 10.57; N, 7.73.

Found: C, 72.82; H, 10.38; N, 7.49.

The remainder of the residue was dissolved in ether and treated with ethereal hydrogen chloride and the resulting amine salt was recovered by filtration and washed with ether to give 1.26 of N-methyl-1-adamantanamine-4α-ol hydrochloride. An analytical sample was recrystallized from methanol-acetone, m.p. 220°–221° C.

Anal. Calcd. for $C_{11}H_{20}NOCl$:
C, 60.67; H, 9.26; N, 6.43; Cl, 16.29.

Found C, 60.54; H, 9.50; N, 6.42; Cl, 16.42.

EXAMPLE 29  N-methyl-1-adamantanamine-4α,6α-diol and the hydrochloride salt

A mixture of 4 g. of N-benzyl-N-methyl-1-adamantanamine-4α,6α-ol is dissolved in 60 ml. of ethanol and treated with 0.5 g. of 10 percent palladium on carbon shaken with hydrogen (40 p.s.i.g.) for 3 hours. The catalyst is removed by filtration and the filtrate is evaporated to dryness under reduced pressure to give N-methyl-1-adamantanamine-4α,6α-diol as a white solid, which is further purified by recrystallization from ether.

The hydrochloride salt is prepared by dissolving the free base in ether and adding an ether solution containing one equivalent of hydrogen chloride. The insoluble salt is recovered by filtration and recrystallized from methanol-acetone as a white crystalline solid.

Example 30  1-formamidoadamantan-4α-ol.

A solution of 3.5 g. of 1-adamantanamine-4α-ol in 1 l. of ether was treated with a slight excess of 98 percent formic acid. The resulting precipitate of formate salt was recovered by filtration and washed with ether; yield 3.60 g. of 1-adamantanamine- 4α-ol formate, m.p. 238-239° C.

One gram of 1-adamantanamine-4α-ol formate was heated at 270° C. for 2 minutes and cooled. The residue was taken up in a small volume of ethyl acetate and chromatographed over a column prepared from a slurry of 100 g. of silica gel and ethyl acetate saturated with water. The column was eluted with the same solvent in fractions of 50 ml. each. Product fractions containing 1-formamidoadamantan-4α-ol were determined by infrared inspection of the residues (0.58 g.). A sample of the residues for analysis was recrystallized from methanol-benzene to give 1-formamidoadamantan-4α-ol, m.p. 141°-142° C.

Anal. Calcd. for $C_{11}H_{17}NO_2$: C, 67.66; H, 8.78; N, 7.17.

Found: C, 67.52; H, 8.79; N, 7.42.

Example 31 N-methyl-1-adamantanamine-4α-ol hydrochloride

A mixture of 0.5 g. of 1-formamidoadamantan-4α-ol, 2.0 ml. of pyridine, and 1.0 ml. of acetic anhydride was allowed to stand at 25° C. for 16 hours. The mixture was diluted with water, extracted with methylene chloride. The extract was washed with dilute sulfuric acid, water, and dried over sodium sulfate. The solvent was removed under reduced pressure and the residue was taken up in 25 ml. of anhydrous tetrahydrofuran and added with stirring to a mixture of 0.5 g. of lithium aluminum hydride in 25 ml. of anhydrous ether. The mixture was heated at reflux for 2 hours, and chilled at 0° C. during the addition of 5.0 ml. of water. The mixture was filtered, the solids were washed well with ether, and the filtrate and wash was dried over magnesium sulfate. The solution was freed of drying agent and treated with a sight excess of ethereal hydrogen chloride. The N-methyl-1-adamantanamine-4α-ol hydrochloride was recovered by filtration and recrystallized from methanol-acetone, m.p. 219°-220° C.

Example 32 N-methyl-1-benzamidoadamantan-4 α,6α-diol diacetate

The N-methyl-1-benzamidoadamantan-4α,6α-diol (0.5 g.), pyridine (5.0 ml.), and acetic anhydride (2.0 ml.) was mixed and warmed to dissolve the reactant and allowed to stand at room temperature for 17 hours. The mixture was poured onto ice and stirred for several minutes. The product was recovered by filtration, washed with water, and recrystallized from aqueous acetone to give N-methyl-1-benzamidoadamantan-4α,6α-diol diacetate, m.p. 141°-142° C.

Anal. Calcd. for $C_{22}H_{27}NO_5$: C, 68,55; H, 7.06; N, 3.63.

Found: C, 68.88; H, 7.35; N, 3.75.

Example 33 N-methyl-1-benzamidoadamantan-4 α,6α-diol cyclic sulfite

One-half gram of diol was treated with 1.0 ml. of thionyl chloride; immediate heat of reaction was noted and after 15 minutes the excess reagent was removed under reduced pressure. The residue was chromatographed over 100 g. of Florisil by the gradient method, placing the material on the column with methylene chloride and eluting in fractions of 110 ml. each, with 4 l. of solvent, Skellysolve B containing increasing proportions of acetone from 0–40 percent. Fractions 13–16 contained 0.35 g. of product which was recrystallized from ether-Skellysolve B as white needles of N-methyl-1-benzamidoadamantan-4α,6α-diol cyclic sulfite, m.p. 172°–173° C.

Anal. Calcd. for $C_{18}H_{21}NO_4S$: C, 62.22; H, 6.09; N, 4.03; S, 9.23.

Found: C, 62.28; H, 5.64; N, 3.73; S, 9.21.

Example 34 4-methylene-N-methyl-1-benzamidoadamantane

A solution of 100 ml. of 1.6 M n-butyl lithium in hexane was added with stirring under a nitrogen atmosphere to a mixture of 57.3 g. of methyl triphenyl phosphonium bromide and 500 ml. of benzene. A solution of 45.4 g. of N-methyl-1-benzamidoadamantan-4-one in 150 ml. of benzene was added dropwise under nitrogen with stirring at 50° C. The mixture was heated at 60°–70° C. for 2 hours and allowed to stand at 25° C. for 18 hours and then stirred with 200 ml. of water for 3 hours. The organic layer was separated and concentrated under reduced pressure to 200 ml., filtered and the filtrate was chromatographed over 1,200 g. of silica gel packed on a column with 1:1 ethyl acetate-cyclohexane. The product was eluted in 600 ml. cuts with the same solvent mixture. Fractions 2–5 contained 43.18 g. of product which was recrystallized from methylene chloride-Skellysolve B hydrocarbons to give 40.1 g. of analytically pure 4-methylene-N-methyl-1-benzamidoadamantane, m.p. 94°–96° C.

Anal. Calcd. for $C_{19}H_{23}NO$: C, 81.10; H, 8.24; N, 4.98.

Found: C, 81.01; H, 8.31; N, 4.88.

Example 35 4β,N-dimethyl-1-benzamidoadamantane and 4α,N-dimethyl-1-benzamidoadamantane (4)

A solution of 25.0 g. of 4-methylene-N-methyl-1-benzamidoadamantane in 250 ml. of methanol was purged with a nitrogen atmosphere, treated with 1.0 g. of platinum oxide catalyst, and was shaken with hydrogen for 1 hour. The starting hydrogen pressure of 54.5 psi dropped to 26.3 psi and remained constant. The catalyst was removed by filtration and the filtrate was concentrated to dryness under reduced pressure to give 24.5 g. of solid residue. Examination of the residue by silica gel TLC developed with 10 percent ethyl acetate in Skellysolve B hydrocarbons showed the presence of two isomers which were separated into their pure forms by repeated chromatography on 2400 g. of silica gel, using 10 percent ethyl acetate in Skellysolve B hydrocarbons as the eluting solvent. The lower melting isomer was eluted first and crystallized from Skellysolve B hydrocarbons to give 11.98 g., of 4βN-dimethyl-1-benzamidoadamantane, m.p. 63°–65° C.

Anal. Calcd. for $C_{19}H_{25}NO$: C, 80.52; H, 8.89; N, 4.94.

Found: C, 80.50; H, 8.94; N, 4.94.

The slightly slower moving component was isolated and crystallized from Skellysolve B hydrocarbons to give 7.19 g. of 4α,N-dimethyl-1-benzamidoadamantane, m.p. 90°–94° C.

Anal. Calcd. for $C_{19}H_{25}NO$: C, 80.52; H, 8.89; N, 4.94.

Found: C, 80.20; H, 8.93; N, 4.98.

Example 36 Oxygenation of 4β,N-dimethyl-1-benzamidoadamantane to 4β,N-dimethyl-1-benzamidoadamantane-4α,6α-diol and 4β,N-dimethyl-1-benzamidoadamantane-4α,7-diol The bioconversion and extraction procedures of Example 2 were repeated using 4β,N-dimethyl-1-benzamidoadamantane as the substrate. The methylene chloride extracts were evaporated to dryness and the residue was dissolved in a minimal amount of methylene chloride and chromatographed over 200 g. of Florisil. The column was eluted with 4 l. of Skellysolve B hydrocarbons containing increasing proportions of acetone from 0 to 50 percent. The fraction residues were examined by infrared and thin layer chromatography. The fractions containing the 4α,6α-diol (0.73 g.) were combined and recrystallized from methylene chloride-ether to give 0.486 g. of 4β,N-dimethyl-1-benzamidoadamantane- 4α,6α-diol, m.p. 175°–178° C.

Anal. Calcd. for $C_{19}H_{25}NO_3$: C, 72.35; H, 7.99; N, 4.44.

Found: C, 71.93; H, 7.96; N, 4.27.

The fractions containing the 4α,7-diol (0.627 g.) were combined and recrystallized from methylene chloride - ether to give 0.410 g. of 4β,N-dimethyl-1-benzamidoadamantane-4α,7-diol, m.p. 211°–214° C.

Anal. Calcd. for $C_{19}H_{25}NO_3$: C, 72.35; H, 7.99; N. 4.44.

Found: C, 71.95; H, 7.90; N, 4.65.

Example 37 4β,N-dimethyl-1-benzamidoadamantane-4α,6α-diol cyclic sulfite ester

A mixture of 0.10 g. of 4β,N-dimethyl-1-benzamidoadamantane-4α,6α-diol and 1.0 ml. of thionyl chloride was heated at 90° C. for 20 minutes. The mixture was diluted with 20 ml. of methylene chloride and taken to dryness under reduced pressure. The residue was chromatographed over 20 g. of Florisil. Elution was with 1 liter of Skellysolve B containing increasing proportions of acetone from 0 to 40 percent. Fractions of 25 ml. each were collected. The fractions were examined by infrared and thin layer chromatography and those containing the desired product were combined and recrystallized from ether - Skellysolve B; to give 4β,N-dimethyl-1-benzamidoadamantane-4α,6α-diol cyclic sulfite ester, m.p. 152°–154° C.

Anal. Calcd. for $C_{19}H_{23}NO_4S$: C, 63.13; H, 6.41; S, 8.87.

Found: C, 63.28; H, 6.67; S, 8.89.

Example 38 4β,N-dimethyl-1-benzamidoadamantane-4α-ol-6-one (8)

A solution of 1.63 g. of 4β,N-dimethyl-1-benzamidoadamantane-4α,6α-diol in 100 ml. of acetone was treated dropwise with chromic acid solution (prepared from 267 g. of chromic anhydride, 230 ml. of sulfuric acid, and water sufficient to make 1 liter) until a slight excess had been added. The mixture was stirred for 5 minutes; 1.0 ml. of isopropanol was added and the acetone was removed at 25° C. The residue was taken up in methylene chloride and water. The methylene chloride layer was washed with water, dried over anhydrous sodium sulfate, and the solvent removed. The residue thus obtained was taken up in acetone; the solution was treated with activated vegetable carbon and the filtrate therefrom was concentrated and diluted with water to precipitate the product; yield 0.968 g. of 4β,N-dimethyl-1-benzamidoadamantane-4α-ol-6-one, m.p. 187°–189° C.

Anal. Calcd. for $C_{19}H_{23}NO_3$: C, 72.81; H, 7.40.

Found: C, 72.88; H, 7.40.

Example 39 4-methylene-N-methyl-1-benzamidoadamantan-6-one

A mixture of 0.90 g. of 4β,N-dimethyl-1-benzamidoadamantan-4α-ol-6-one and 10.0 ml. of thionyl chloride was warmed at 90° C. for 5 minutes. Excess thionyl chloride was removed under reduced pressure and the residue was mixed and allowed to stand with water for 1 hour. The solid was recovered by filtration, washed with water, and dried. The residue was recrystallized from ethyl acetate to give 0.10 g. of 4-methylene-N-methyl-1-benzamidoadamantan-6-one, m.p. 159°–161° C. The filtrate residue from this product contained chloride and was taken up in 12 ml. of methanol and 5.0 ml. of 10 percent methanolic potassium hydroxide solution and heated at reflux for 3 hours. The product was obtained by boiling and adding hot water, cooling and filtration; yield 0.16 g., of 4-methylene-N-methyl-1-benzamidoadamantan-6-one, m.p., 162°–163° C. This was combined with 0.10 g. of product from above, and recrystallized from aqueous acetone to give 4-methylene-N-methyl-1-benzamidoadamantan-6-one, m.p. 162°–163° C.

Anal. Calcd. for $C_{19}H_{21}NO_2$: C, 77.26; H, 7.17; N, 4.74.

Found: C, 76.78; H, 7.62; N, 4.76.

Example 40 4β,N-dimethyl-1-benzamidoadamantan-6-one and 4α,N-dimethyl-1-benzamidoadamantan-6-one A solution of 0.155 g. of 4-methylene-N-methyl-1-benzamidoadamantan-6-one in 25 ml. of methanol was treated with 40 mg. of 10 percent palladium on carbon catalyst and was shaken with hydrogen at 35 psi pressure for 110 minutes. The catalyst was removed by filtration and the filtrate was concentrated under reduced pressure to give a mixture of 4β,N-dimethyl-1-benzamidoadamantane-6-one and 4α,N-dimethyl-1-benzamidoadamantane-6-one in the ratio of about one part of the former to four parts of the latter as determined by NMR spectroscopy. Recrystallization from aqueous methanol gave pure 4α-N-dimethyl-1-benzamidoadamantan-6-one, m.p. 138°–140° C. The residue from the filtrate was rich in 4β,N-dimethyl-1-benzamidoadamantan-6-one as determined by N.M.R. spectroscopy and recoverable by methods known in the art.

Example 41 Oxygenation of 4α,N-dimethyl-1-benzamidoadamantane to 4α,N-dimethyl-1-benzamidoadamantan-6α-ol The bioconversion and extraction procedures of Example 2 were repeated using 4α,N-dimethyl-1-benzamidoadamantane as the substrate. The methylene chloide extracts were evaporated to dryness and the residue was dissolved in a minimal amount of methylene chloride and chromatographed over 150 g. of Florisil. The column was eluted in fractions of 90 ml. each with 4 l. of Skellysolve B containing increasing proportions of acetone from 0 to 25 percent. The fraction residues were evaporated to dryness and examined by infrared and thin layer chromatography. Those containing the desired product were combined and recrystallized from methylene chloride - ether to give 4α,N-dimethyl-1-benzamidoadamantan-6α-ol, m.p. 181°–182° C.

Anal. Calcd. for $C_{19}H_{25}NO_2$: C, 76.22; H, 8.42; N, 4.68.

Found: C, 76.33; H, 8.21; N, 4.71.

Example 42  4α,N-dimethyl-1-benzamidoadamantan-6-one

A solution of 0.013 g. of 4α,N-dimethyl-1-benzamidoadamantan-6-ol in 2.5 ml. of acetone was treated for 5 minutes with 3 drops of chromic acid solution (prepared from 267 g. of chromic anhydride, 230 ml. of sulfuric acid, and water sufficient to make 1 liter). Three drops of isopropanol was added and the acetone was allowed to evaporate. The residue was taken up in methylene chloride and the extract was washed with water and dried over anhydrous sodium sulfate. The solvent was evaporated and the residue was recrystallized from aqueous methanol to give 4α,N-dimethyl-1-benzamidoadamantan-6-one, m.p. 136°–137° C.

Anal. Calcd. for $C_{19}H_{23}NO_2$: C, 76.73; H, 7.80.

Found: C, 76.47; H, 7.98.

The novel compounds of this invention produced by Examples 36–42, above, namely, 4β,N-dimethyl-1-benzamidoadamantane-4α,6α-diol, 4β,N-dimethyl-1-benzamidoadamantane-4α,7-diol, 4β,N-dimethyl-1-benzamidoadamantane-4α,6α-diol cyclic sulfite ester, 4β,N-dimethyl-1-benzamidoadamantane-4α-ol-6-one, 4-methylene-N-methyl-1-benzamidoadamantan-6-one, 4β,N-dimethyl-1-benzamidoadamantan-6-one, 4α,N-dimethyl-1-benzamidoadamantan-6-one, 4α,N-dimethyl-1-benzamidoadamantan-6α-ol and 4α,N-dimethyl-1-benzamidoadamantan-6-one, are useful for the same purposes as the compounds embraced by Formulas (1), (2), (3), and (4) above. They are all central nervous system stimulants. They are all mood elevators and psychic energizers and are useful in the treatment of mental health conditions and can be used and administered as heretofore disclosed.

We claim:

1. A compound of the formula:

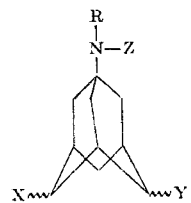

wherein Z is formyl, acetyl, propionyl, butyryl, isobutyryl, tert.-butylacetyl, valeryl, isovaleryl, caproyl, caprylyl, decanoyl, dodecanoyl, acrylyl, crotonyl, hexynoyl, heptynoyl, octynoyl, cyclobutylcarbonyl, cyclopentylcarbonyl, cyclopentenylcarbonyl, cyclohexylcarbonyl, dimethylcyclohexylcarbonyl, benzoyl, toluyl, naphthoyl, ethylbenzoyl, phenylacetyl, naphthylacetyl, phenylvaleryl, cinnamoyl, phenylpropiolyl, phenylpropionyl, cyclopentylpropionyl, myristoyl, palmitoyl or stearoyl; R is hydrogen benzyl, phenethyl, phenylpropyl, benzhydryl, naphthlmethyl, o-carboxylbenzyl, phenyl, tolyl, xylyl, naphthyl, biphenyl, an alkyl radical of one to 18 carbon atoms, inclusive or a cycloalkyl radical of five to 15 carbon atoms, inclusive; X is hydrogen, hydroxy or keto; and Y is hydroxy or keto.

2. 1-acetamidoadaman-4-ol, the compound of claim 1, wherein Z is acetyl, X is hydrogen, Y is hydroxy and R is hydrogen.

3. 1-benzamidoadamantan-4α-ol, the compound of claim 1, wherein Z is benzoyl, X is hydrogen, Y is α-hydroxy and R is hydrogen.

4. 1-acetamidoadamantan-4-one, the compound of claim 1, wherein Z is acetyl, X is hydrogen, Y is keto and R is hydrogen.

5. 1-acetamidoadamantan-4α-ol, the compound of claim 1, wherein R is hydrogen, Z is acetyl, X is hydrogen and Y is α-hydroxy.

6. 1-acetamidoadamantan-4β-ol, the compound of claim 1, wherein R is hydrogen, Z is acetyl, X is hydrogen and Y is β-hydroxy.

7. N-methyl-1-benzamidoadamantan-4α-ol, the compound of claim 1, wherein R is methyl, Z is benzoyl, X is hydrogen and Y is α-hydroxy.

8. N-methyl-1-benzamidoadamantan-4α,6α-diol, the compound of claim 1, wherein R is methyl, Z is benzoyl, and X and Y are each α-hydroxy.

9. N-methyl-1-benzamidoadamantan-4,6-dione, the compound of claim 1, wherein R is methyl, Z is benzoyl and X and Y are each keto.

10. N-methyl-1-benzamidoadamantan-4-one, the compound of claim 1, wherein R is methyl, Z is benzoyl, X is hydrogen and Y is keto.

11. 1-formamidoadamantan-4α-ol, the compound of claim 1, wherein R is hydrogen, Z is formyl, X is hydrogen and Y is α-hydroxy.

12. N-methyl-1-cyclohexylcarboxamidoadamantan-4α,6α-diol, the compound of claim 1, wherein R is methyl, Z is cyclohexylcarbonyl, and X and Y are each α-hydroxy.

13. 1-phenylacetamidoadamantan-4α,6α-diol, a compound of claim 1, wherein R is hydrogen, Z is phenylacetyl, and X and Y are each α-hydroxy.

14. 1-phenylacetamidoadamantan-4α-ol, the compound of claim 1, wherein R is hydrogen, Z is phenylacetyl, X is hydrogen and Y is α-hydroxy.

15. 1-benzamidoadamantan-3-ol.

* * * * *